US009952820B2

(12) United States Patent
Anderson et al.

(10) Patent No.: US 9,952,820 B2
(45) Date of Patent: Apr. 24, 2018

(54) AUGMENTED REALITY REPRESENTATIONS ACROSS MULTIPLE DEVICES

(75) Inventors: Glen J Anderson, Portland, OR (US); Wendy A. March, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 562 days.

(21) Appl. No.: 13/977,610

(22) PCT Filed: Dec. 20, 2011

(86) PCT No.: PCT/US2011/066218
§ 371 (c)(1),
(2), (4) Date: Jun. 28, 2013

(87) PCT Pub. No.: WO2013/095393
PCT Pub. Date: Jun. 27, 2013

(65) Prior Publication Data
US 2013/0290876 A1 Oct. 31, 2013

(51) Int. Cl.
G06F 3/14 (2006.01)
G06T 19/00 (2011.01)
G09G 5/14 (2006.01)

(52) U.S. Cl.
CPC .......... *G06F 3/1423* (2013.01); *G06T 19/006* (2013.01); *G06F 3/1454* (2013.01); *G09G 5/14* (2013.01)

(58) Field of Classification Search
CPC ......... G06T 19/006; G06T 2207/10028; G06T 2219/024; G06T 15/20; G06T 19/00;
(Continued)

(56) References Cited

U.S. PATENT DOCUMENTS 6,057,856 A * 5/2000 Miyashita ............... G06T 15/00
345/633
6,344,836 B1 * 2/2002 Suzuki ................... G06F 3/1423
345/1.2
(Continued)

FOREIGN PATENT DOCUMENTS

CN 101553752 10/2009
JP 2000-352960 12/2000
(Continued)

OTHER PUBLICATIONS

PCT Search Report, PCT/US2011/066218, Intel Corporation, dated Jun. 1, 2012, 9 pages.
(Continued)

*Primary Examiner* — Abdullah Al Kawsar
*Assistant Examiner* — Maria S Ayad
(74) *Attorney, Agent, or Firm* — Womble Bond Dickinson (US) LLP (57) ABSTRACT

Methods and apparatus to produce augmented reality representations across multiple devices are described. In one example, operation include generating a virtual object, generating a reality space including a first display, and presenting the virtual object in the reality space including the first display on a second display. Further operations include tracking a location of the virtual object in the reality space as the virtual object moves through the reality space, updating the presentation of the virtual object on the second display using the tracked location, and presenting the virtual object on the first display when the tracked location of the virtual object coincides with the location of the first display in the reality space.

20 Claims, 9 Drawing Sheets

(58) Field of Classification Search
CPC ... G06T 2215/16; G11B 27/034; G11B 27/34; G11B 2220/90; G11B 27/024; G11B 27/032; G11B 2220/2545; G11B 2220/2562; G11B 2220/913; G11B 27/031; G11B 27/038; G11B 2220/41; G11B 27/105; G06F 3/011; G06F 17/30; G06F 3/04815; G06F 3/1423; G06F 3/017; G06F 3/0346; G06F 17/30994; G06F 1/1605; G06F 1/1639; G06F 3/0304; A63F 13/10; A63F 2300/8082; A63F 13/12; H04L 65/403; H04M 3/567; Y10T 29/49002; Y10T 29/49826; B60K 2350/352
USPC ........ 715/761, 757, 719, 753; 345/629, 633; 725/34
See application file for complete search history.

(56) References Cited

U.S. PATENT DOCUMENTS

| | | | |
|---|---|---|---|
| 7,084,869 B2* | 8/2006 | Sriram | A63F 13/10 345/419 |
| 7,991,220 B2* | 8/2011 | Nagai | A63F 3/00643 345/633 |
| 8,405,680 B1* | 3/2013 | Cardoso Lopes | G06T 19/00 345/426 |
| 8,990,682 B1* | 3/2015 | Wong | G02B 27/017 715/254 |
| 9,011,246 B1 | 4/2015 | Kier et al. | |
| 9,081,177 B2* | 7/2015 | Wong | G02B 27/0093 |
| 2002/0075286 A1* | 6/2002 | Yonezawa | G02B 27/017 345/679 |
| 2003/0112281 A1 | 6/2003 | Sriram et al. | |
| 2004/0041822 A1* | 3/2004 | Iizuka | G06T 15/005 345/634 |
| 2004/0193413 A1* | 9/2004 | Wilson | G06F 3/017 704/243 |
| 2004/0240652 A1* | 12/2004 | Kanada | H04M 3/42365 379/201.1 |
| 2008/0030499 A1* | 2/2008 | Wanda | G06F 3/011 345/419 |
| 2010/0060648 A1 | 3/2010 | Carter et al. | |
| 2010/0265164 A1* | 10/2010 | Okuno | G06T 19/006 345/8 |
| 2010/0292004 A1* | 11/2010 | Tokita | A63F 13/06 463/32 |
| 2010/0321389 A1 | 12/2010 | Gay et al. | |
| 2011/0084983 A1 | 4/2011 | Demaine | |
| 2011/0175801 A1* | 7/2011 | Markovic | G06F 3/017 345/156 |
| 2011/0216002 A1* | 9/2011 | Weising | G09G 5/08 345/158 |
| 2011/0242134 A1* | 10/2011 | Miller | G06T 19/006 345/633 |
| 2012/0124509 A1* | 5/2012 | Matsuda | G06F 3/011 715/782 |
| 2012/0293513 A1* | 11/2012 | Krishnaswamy | H04N 13/004 345/423 |
| 2013/0050432 A1* | 2/2013 | Perez | H04N 13/0278 348/47 |
| 2013/0063560 A1* | 3/2013 | Roberts | G06F 3/011 348/46 |
| 2013/0307875 A1 | 11/2013 | Anderson | |
| 2013/0328762 A1* | 12/2013 | McCulloch | G02B 27/017 345/156 |
| 2013/0342570 A1 | 12/2013 | Kinnebrew et al. | |
| 2014/0002444 A1 | 1/2014 | Bennett et al. | |
| 2014/0320744 A1 | 10/2014 | Fan | |

FOREIGN PATENT DOCUMENTS

| | | |
|---|---|---|
| JP | 2001-136504 | 5/2001 |
| JP | 2002-230586 | 6/2002 |
| JP | 2004-310470 | 11/2004 |
| JP | 2009-281830 | 12/2009 |
| JP | 2011-028309 | 2/2011 |
| TW | 201108037 | 3/2001 |
| WO | WO-2010/122859 | 10/2010 |
| WO | WO-2011/010533 | 1/2011 |

OTHER PUBLICATIONS

Kimura et al, "Design Scheme and Implementation of WATARI-System-Wall and Tabletop Based Reconfigurable Internaction Workspace," Journal of the Virtual Reality Society of Japan, vol. 15, No. 2, p. 191-201, Jun. 30, 2010.
European Search Report for EP Counterpart Application No. 11878165.7, 3 pgs., dated Jul. 8, 2015.
Chinese Search Report for on CN Counterpart Application No. 2011800752845, 2 pgs., (dated Oct. 9, 2015).
Decision for Grant from Counterpart JP Patent Application No. 2014-547168, dated Sep. 30, 2015, 1 page.
Search Report from counterpart Chinese Patent Application No. 2011800752845, dated Nov. 4, 2016, 2 pages.

* cited by examiner

AUGMENTED REALITY REPRESENTATIONS ACROSS MULTIPLE DEVICES

CROSS-REFERENCE TO RELATED APPLICATION

This patent application is a U.S. National Phase Application under 35 U.S.C. § 371 of International Application No. PCT/US2011/066218, filed Dec. 20, 2011, entitled "AUGMENTED REALITY REPRESENTATIONS ACROSS MULTIPLE DEVICES".

BACKGROUND

Augmented Reality (AR) includes techniques for showing virtual objects superimposed over an image of a real place. In a simple example, the image is a view of a street that includes a restaurant and this reality is augmented by adding the name of the restaurant superimposed over the image of the restaurant. This has been expanded to include menus, reviews, friends that are inside, and other information. The image may be a video sequence of images. Smartphone applications have been proposed or developed which allow the user to point a camera phone at a location and see the location on the smartphone display. The application then obtains data about the location, such as restaurant names, etc. and then augments the reality shown in the smartphone display with the names, menus, reviews, etc.

AR techniques have also been used to mix real world video with three-dimensional graphics. In one example AR is used to superimpose virtual people or animals over a video feed of a real scene. In some cases, the real scene is observed by a camera and a person standing in the scene can then make gestures that are observed by the camera and used to provide interactivity between the real person and the virtual person or animal. This interaction between the real person and the virtual person cannot be seen directly by the real person, but through a display that shows the augmented reality view. This view includes the real scene, the real person, and the virtual person.

A further AR development has real objects in the scene being enhanced or converted to virtual objects that interact with other virtual objects or people. So for example, a real candy can turn into virtual explosives and a real picture of a television can virtually display television channels. These types of AR techniques provide entertainment and novelty. With improvement, AR techniques may be used for game play, training, and teaching.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

According to embodiments of the invention, an AR character may emerge from a screen that shows the same character in a non-AR view. In other words, on an AR screen, the character is shown emerging from the second screen. At the same time the second screen also shows the character emerging from that screen for as long as any part of the character remains on that screen. Then the character moves across a real space. This movement cannot be viewed on the second screen but only on the AR screen. The character may also interact with another third screen as viewed with a mix of AR and non-AR displays. As a character moves from screen to screen, data, including but not limited to the character's attributes, may also move from screen to screen or from a device supporting one screen to a device supporting another screen.

Figure 1:
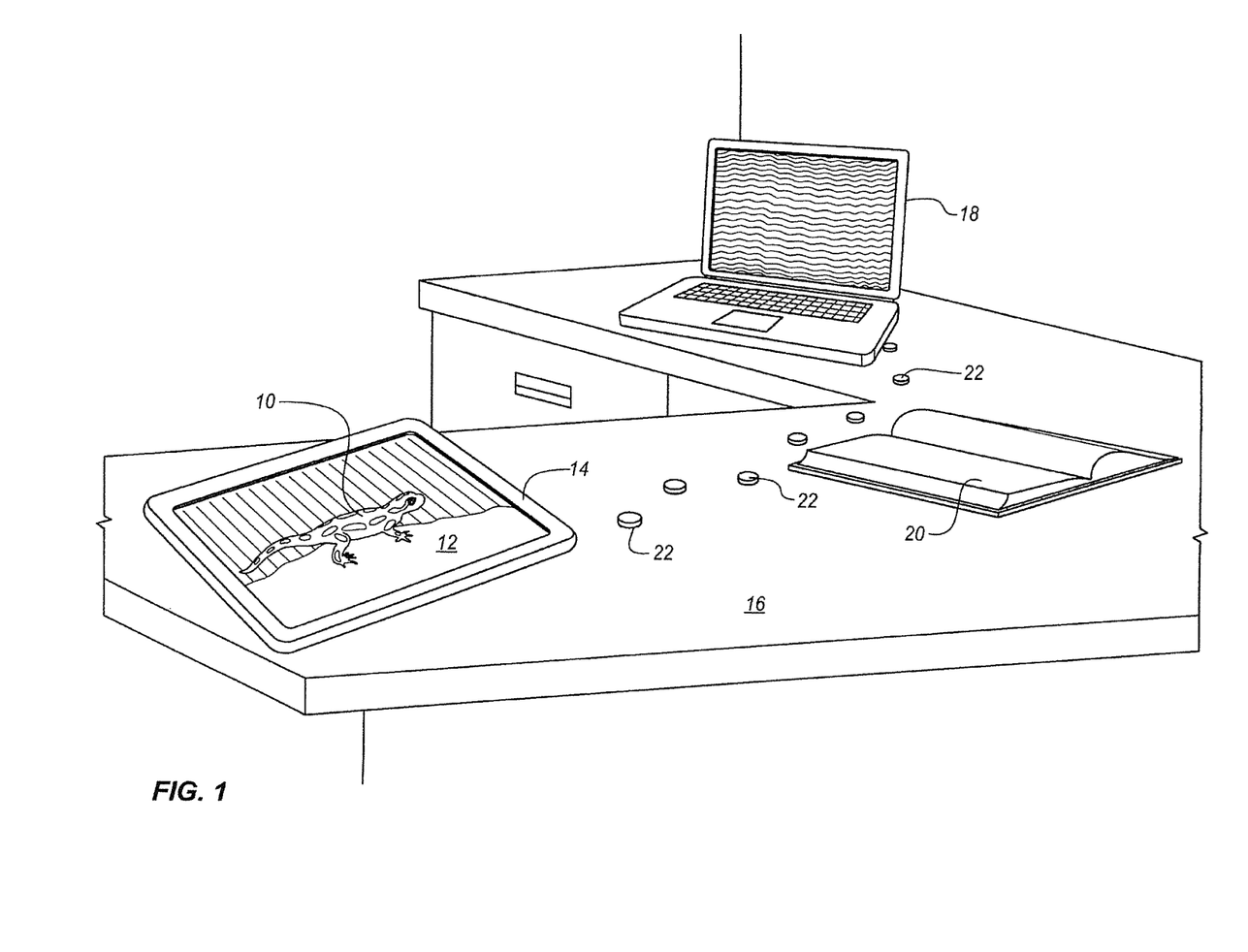
FIG. 1 is diagram of a real scene with multiple displays suitable for AR representations according to an embodiment of the invention.

FIG. 1 shows an example of an interaction between multiple screens in a augmented using AR (augmented reality) techniques. A salamander 10 is presented standing on a mossy rock 12 on a first screen 14. The first screen is the display of a tablet computer that is resting on a desk 16. No AR is involved because the salamander is completely contained within the display. The salamander can be generated as a virtual object in a virtual environment using conventional graphics rendering techniques. The salamander may be generated using two-dimensional or three dimensional techniques. The screen may be capable of two-dimensional or three-dimensional presentation.

The real scene of FIG. 1 also includes a second screen 18 of a second device, in this case a portable notebook computer, although any other type of display device may be used such as a desktop computer screen or television. The two displays are spaced apart from each other across the desk 16 and an opened book 20 with a pen placed on it lies between the two screens. There is also a trail of button candies 22 between the two screens.

Figure 2:
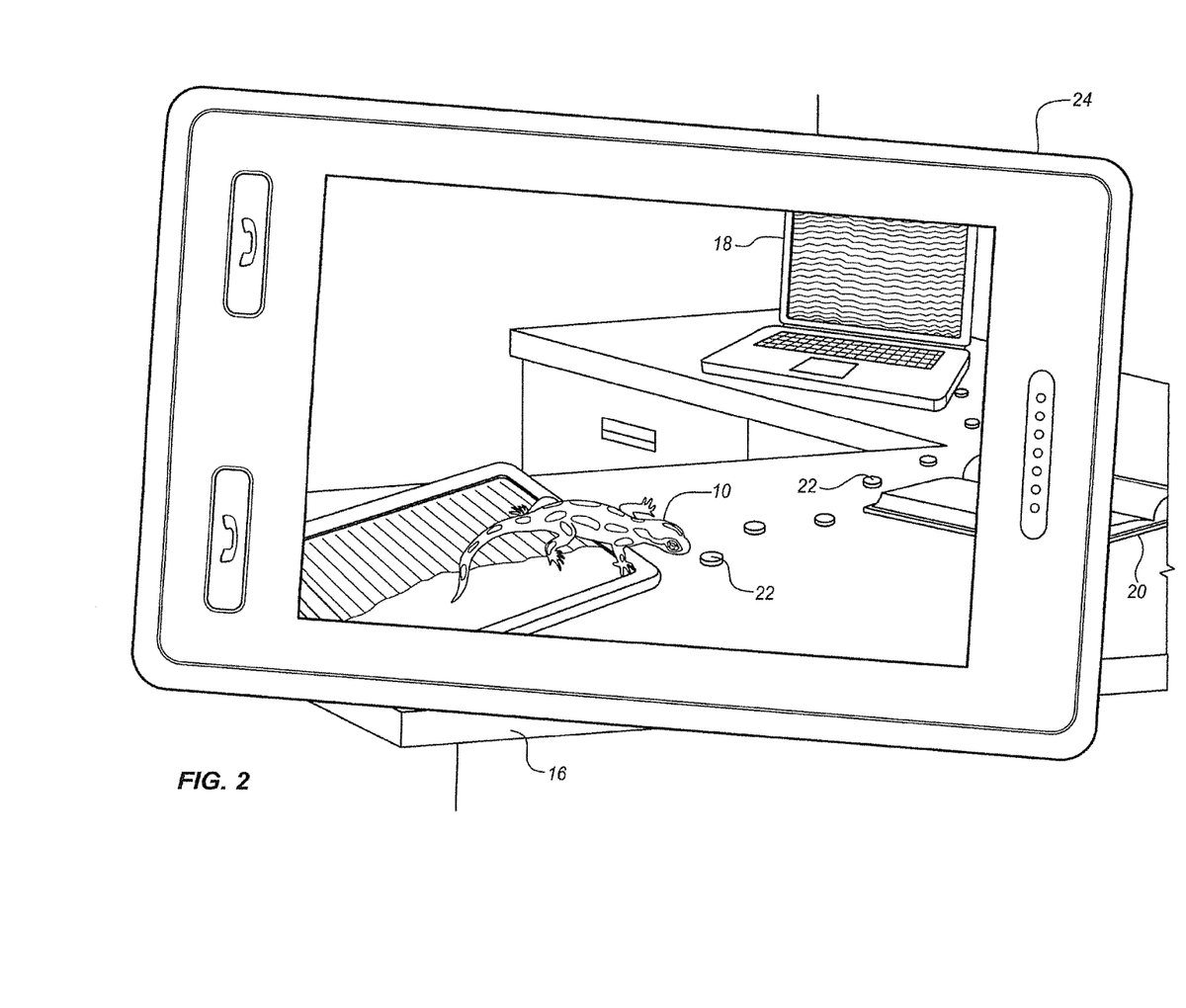
FIG. 2 is diagram of the real scene of FIG. 1 with multiple displays showing an AR character salamander emerging from a display according to an embodiment of the invention.

In FIG. 2, the salamander is shown in a view presented by a third screen 24. The third screen is part of a third device, such as another tablet computer, a cellular telephone or a portable media or gaming player. The third device shows the same desk and slate computer as shown in FIG. 1. This view may be provided using a camera on the back side of the third device or it may be generated from a different device and sent to the third device. The view includes the desk 16 and the two screens 14, 18 as well as the surrounding environment.

As long as the salamander remains in the display, the second device can show exactly what a person in the position of the third screen 24 would see. This view may be generated directly by the device through its own camera or it may be rendered by software, depending on the particular embodiment. In one example, a camera on the back of the device determines the positions of the screens and the desk and then a graphics rendering system generates augmented versions of the first and second screen including augmented screen displays for display on the third display using AR techniques.

As shown in FIG. 2, the salamander 10 is emerging from the tablet screen 14 onto the desk 16, as viewed with AR through the phone 24. The salamander is rendered as an AR character in the third screen. In the third screen the salamander has become a virtual object that is displayed in the context of real objects such as the desk and the button candies.

Figure 3:
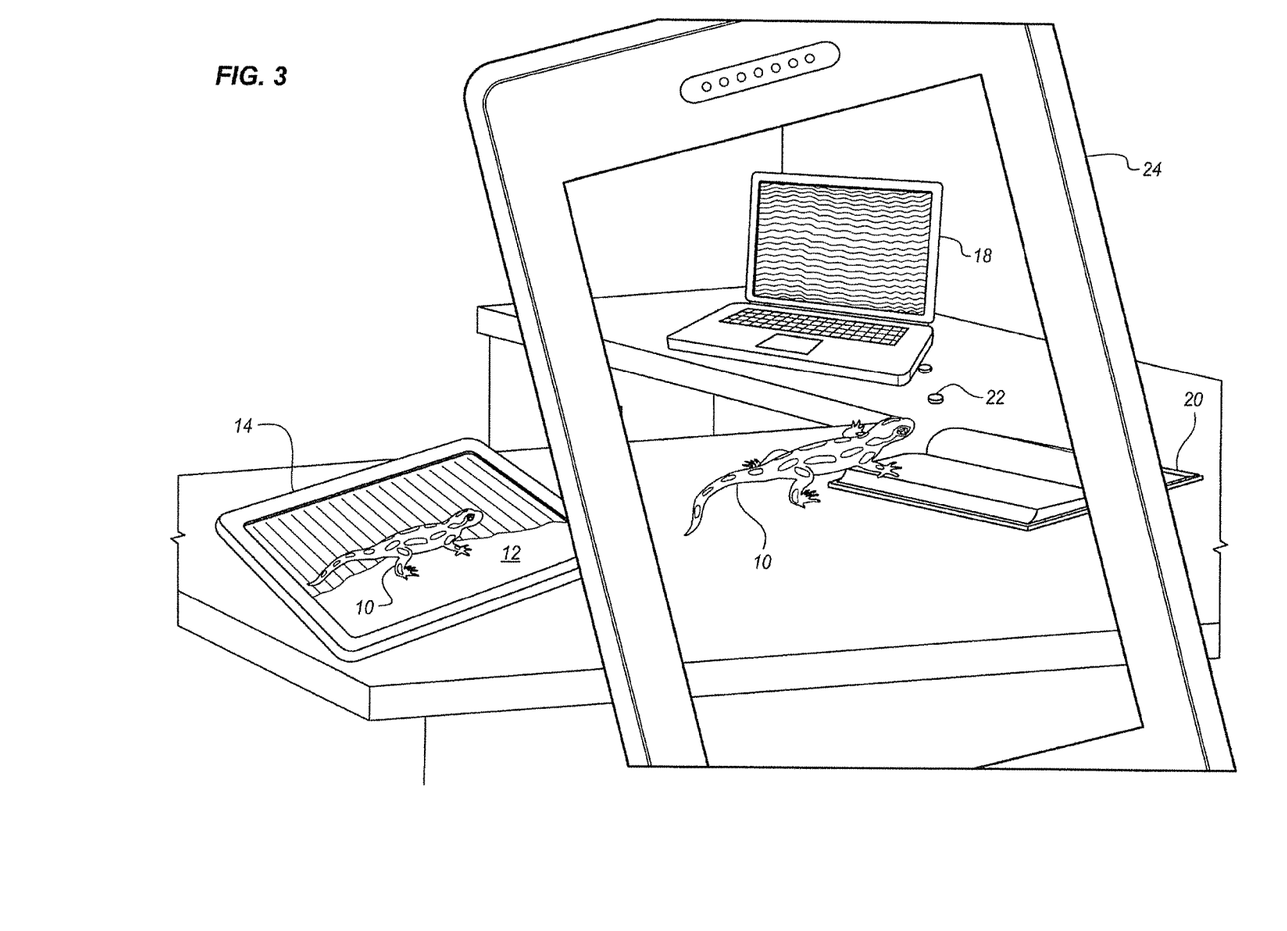
FIG. 3 is diagram of the real scene of FIG. 1 with multiple displays showing an AR character salamander traversing the real scene according to an embodiment of the invention.

In FIG. 3, the salamander is now walking on the desk, being viewed as an AR character through the phone display. It is following the trail of button candies and virtually eating them. On the left side of the figure, the salamander is still standing on the mossy rock exactly as in FIG. 1. This shows that the AR rendering within the third display has not affected the scene actually depicted in the first display 14.

Figure 4:
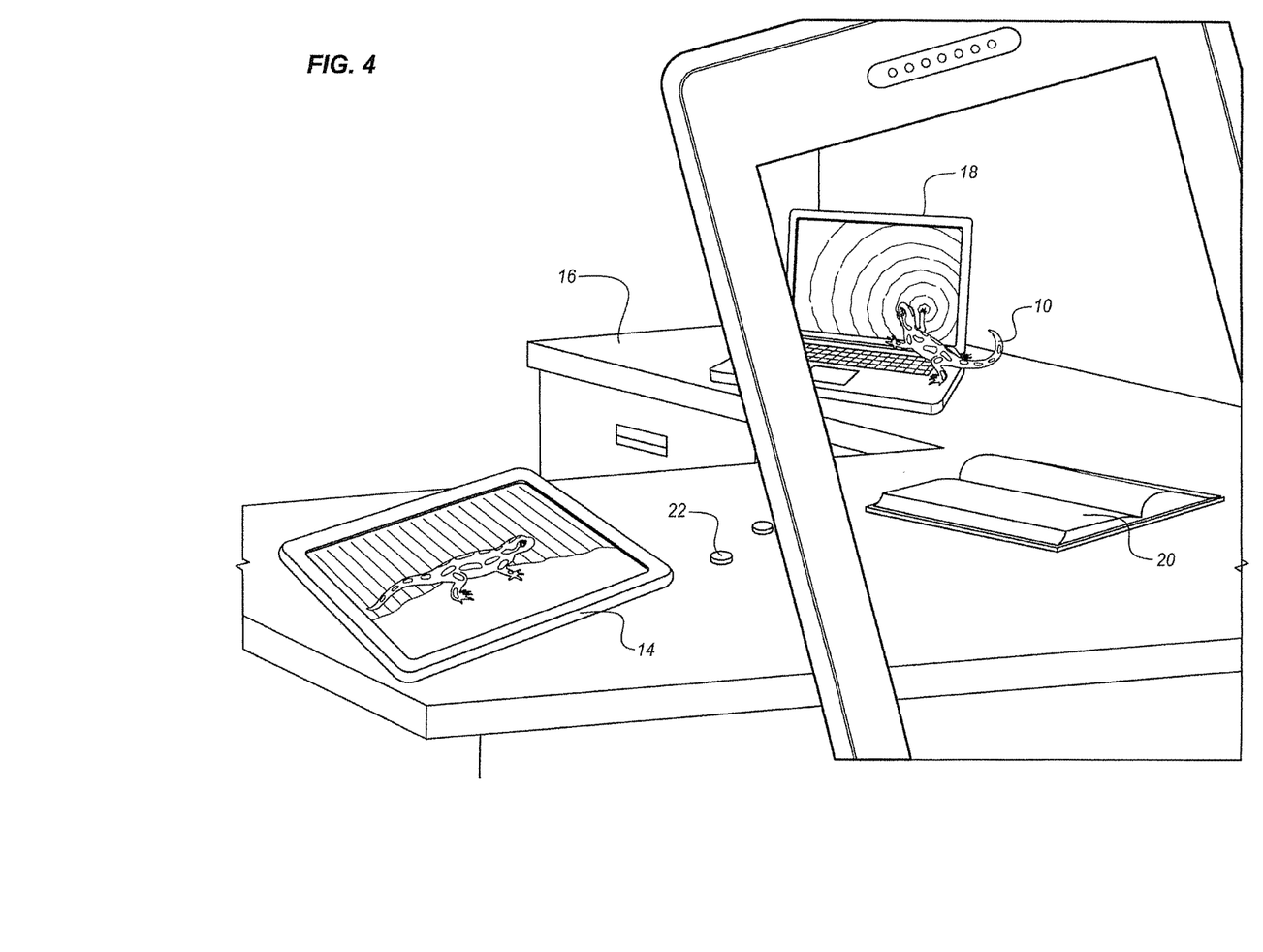
FIG. 4 is diagram of the real scene of FIG. 1 with multiple displays showing an AR character salamander entering a display according to an embodiment of the invention.

In FIG. 4, the salamander 10 is now nibbling the edge of the notebook computer display 18. The water simulation on the screen surface shows ripples with or without viewing through AR. In other words, the salamander is interacting the second screen and the effects of this interaction on the second are seen on the third AR screen. Through a communications link between the second and third devices, the interaction of the salamander can be sent through that link to the third display. The second display can then be caused to produce the water ripples as shown in FIG. 4. The AR screen can then show exactly what the camera of the third device sees on the second screen or it can produce ripples using AR techniques to present on the AR display as if they are on the second screen. As a result, while the salamander can only be seen through the phone, the ripples in the water simulation on the notebook can be seen without AR.

FIG. 4 also shows that the button candies in the real scene visible on the left side of the figure remain on the desk where they originally were placed. In the AR screen, however, the candies have been eaten and are no longer visible. In addition, the salamander is still presented on the first screen 14 in the real scene, even though he has moved over to the second screen in the AR scene depicted in the third AR screen. By providing a communication link to the first screen, the first screen can be made to present the salamander in a way consistent with the AR view. In this case, the first screen would present the mossy rock 12 with no salamander 10, because the salamander has been presented as an AR character and left the first screen.

Notice also that as an AR character, the salamander has interacted not only with the candies but also with book, the notebook computer, and the water displayed on the notebook computer. In addition, comparing FIGS. 1 to 4, the particular items presented on the third display differ depending upon the position of the third display. In FIG. 3, all of the notebook computer and all of the button candies are shown only in the AR display.

The simple interactions of the AR character may be enhanced in a variety of different ways. As a virtual object, rendered as an AR character, the behavior, appearance and characteristics of the AR character can be modified to suit any particular application. While a salamander is shown, any person, animal, or object may be presented. The AR character may also change with interactions with real or other virtual objects. For example, each time the creature meets a candy or eats a candy, it could evolve into a higher life form. In a gaming context, each time a game character absorbs a candy, it could gain more lives, weapons, or keys.

Figure 5:
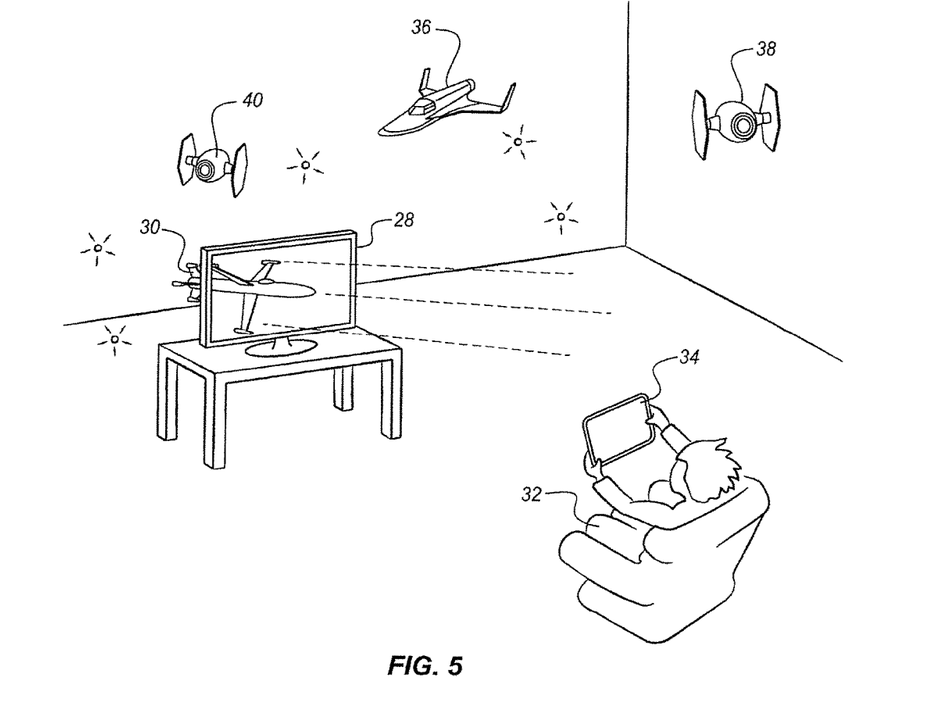
FIG. 5 is diagram of a real scene with multiple displays and multiple AR characters moving about the scene according to an embodiment of the invention.

FIG. 5 shows another example of an AR object presented in a combination of real space and presented space on a first display. In this example, a three-dimensional display 28 in the form of a larger computer desktop display or a television, presents a scene that includes multiple space ships flying about the room. Some of the ships for example a first ship 30 that is within the frame of the television screen 28 can be presented on the display of the television. Depending upon the three-dimensional presentation capabilities of the television, it may also be able to present other ships 36 outside the plane of the screen but still near the screen from the perspective of a viewer or user 32.

As shown the user has a second display 34 such as a table or slate computer with which the user can view additional space ships 36, 38, 40 that appear to be flying around the room. As the user moves the second AR display, different space ships come into view allowing the user to see all of the ship, but not necessarily all at the same time. As with the salamander example, the first ship 30 is emerging from a screen. In this example, the object appears on the 3D television display and may then be viewed in an AR fashion on a tablet as it leaves the screen and flies around the room. The object may appear on the television screen and be shown to be emerging by allowing the two devices to communicate with each other about the virtual object represented as the first space ship.

As with the salamander, the space ships are provided only as an example. The principles may be readily applied to similar types of objects, such as airplanes, birds, fish, submarines, or enemy fighters of any other kind. For training purposes, the same principles may be applied to flight, driving, flying, and other types of training. The same principles may also be applied to medical diagnostic information, or to show mathematical, and scientific concepts for educational or study purposes. In other implementations, a real street scene showing stores and friends, and many other types of information may be provided.

The two examples above may be enhanced by adding still more features to the AR characters. These features may also be generated by game software type elements as described in more detail below. In addition to the visual effects, the AR characters may be configured to make noises, such as the sound of feet, engines, or voices. These noises may be enhanced by three-dimensional processing effects to present an aural position of the character to be added to the spatial position provided by the displays. With multiple speakers, stereoscopic and surround sound effects may be used to make the character sound as if it is in a particular location and as if it is moving.

The characters interaction with other real and virtual objects may also be presented in this way. So, for example, as the salamander virtually eats the real button candies, a chewing and swallowing sound may be produced that sounds as if it is coming from the spatial position of the salamander's mouth. Similarly, as the salamander touches the water on the notebook display causing the ripples, a rippling water sound may be produced that sounds as if it is coming from the notebook computer. This may be augmented by sending instructions and data to the notebook computer to produce the same sound from its own speakers. In the space ship example, there are many different independent and interactive sounds that have been created to suggest sounds that such ships might produce.

The AR character might also be implemented so that it carries elements from one screen to the other. The salamander might carry something with him from the mossy rock and then drop it in the water. A virtual person or vehicle could carry a wide range of different items from one screen to the other. This may be used in game play or as an entertaining animation of data transfer between the two machines. In a game play scenario, one user might receive points, lives, weapons, or tokens using such an animation.

The two examples presented above may be further enhanced with additional user interactions. As part of a game, players may send AR characters toward each other's devices. This could be a form of virtual social interaction, battle, building, or for any other purpose. In such an example, a player may select an AR character, whether a person, animal, vehicle or other object and then direct it to go toward the other player's display. The object might bring something to the other player or interact with other objects on the way.

In another example, a user may use gestures to swipe or flick a touch screen, a controller, or use an air gesture to send an AR character from that user's device toward a specific target or in a more general direction. Using the interactive and communicative multiple screen AR described above, the originating user might see the AR character on the user's own device, and other users or players may also see the AR character on their own devices. These approaches may be used to allow multiple players to simultaneously engage with the same AR characters. For example several players may virtually shoot at the same space ship after it leaves the main television display screen.

Figure 6:
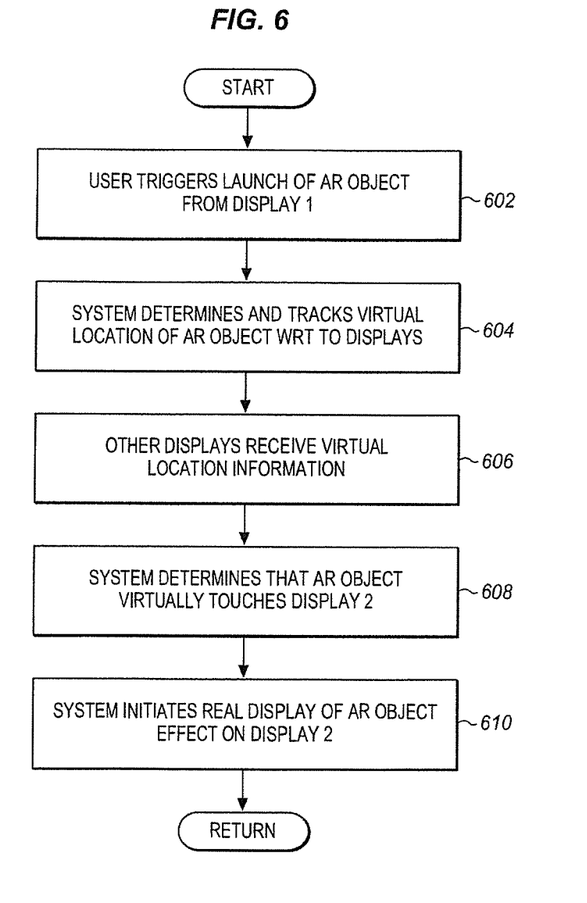
FIG. 6 is a process flow diagram of representing an AR character across multiple displays according to an embodiment of the invention.
Figure 7:
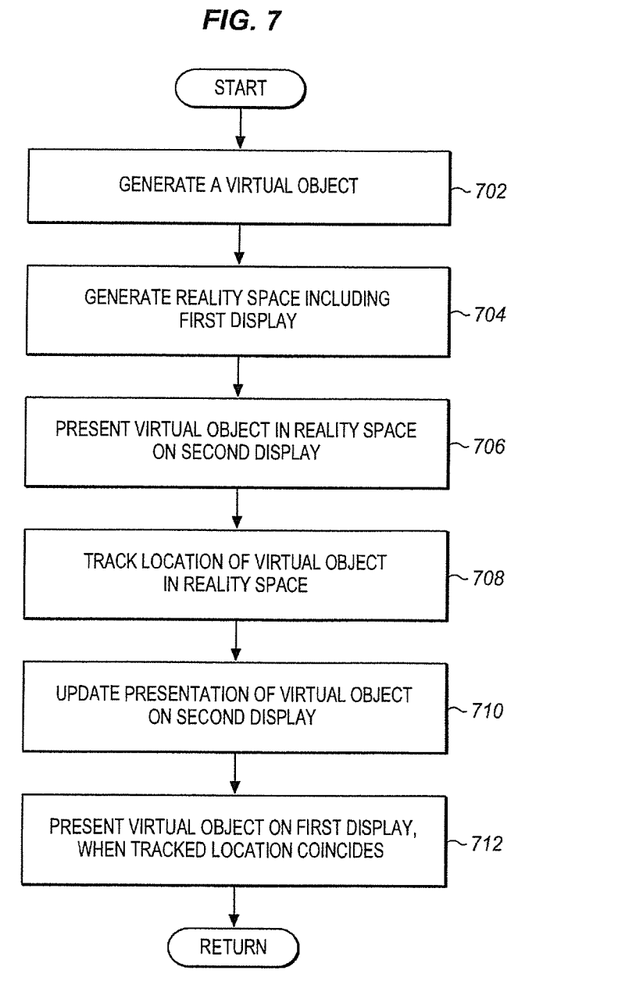
FIG. 7 is a process flow diagram of representing an AR character in a reality space including multiple displays according to another embodiment of the invention.

FIGS. 6 and 7 are example process flow diagrams of generating and using the AR characters with multiple displays as shown in the examples of FIGS. 1 to 5. In FIG. 6, at block 602 a user triggers the launch of an AR object from a display in a system that has multiple displays. Each display may be coupled to its own processing resources or may share resources with the resources of another display. The system may be centrally driven with a single processing system or tasks may be shared between several different processing systems.

The AR object may be an AR character as described above or any virtual object that may be used as an AR character. The character may be launched using any of a variety of different command input systems, from controllers, to touch screens or surfaces, to voice or gesture input systems. In the space ship example, a game controller might be used or a combination of screen gestures with movements of the slate computer.

After the AR character is launched, at 604 the system processing resources determine the virtual location of the AR character and track this location with respect to the other displays in the system. At 606, the virtual location information may be sent to the other displays. This information may be used by the other displays to show shadows, to produce aural cues, such as primary sound effects, vocalizations, or echoes and to provide other effects that enhance the user's AR experience.

At 608, the system determines, through tracking the location at 604, that the AR object has virtually touched a display. This might be display 2 as indicated or any other display in the system. The system can do this by generating a three-dimensional space that includes the displays and then tracking the virtual behavior of the AR character within the real space. At 610, the system initiates a real display of the AR objects effect on the affected display. In the salamander example, above, the salamander may be shown on the first display as leaving the display, and as causing ripples on the second display. These interactions may be presented on the respective display and may be accompanied with an aural representation of the interaction as well, such as a sound of steps or rippling water. The processing resources of the display may be used to determine the particular effect or the determination may be made by another computing resource.

FIG. 7 shows an alternative process of presenting AR characters or other virtual objects using multiple displays. At 702, the system generates a virtual object, such as the salamander or space ship or any other virtual object that might serve as a suitable AR character or interactive AR device. At 704 the system generates a reality space that includes at least one real display. This reality space may be very simple or have multiple real objects. The reality space may also include sound sources.

At 706, the generated virtual object is presented in the reality space on a second display. In the examples above, this second display is a movable portable display through which the real space can be viewed, however, it may alternatively be a fixed display. The virtual object may be presented at any desired location within the real space. As mentioned above, a user may launch or throw the virtual object into the reality space, or the virtual object may emerge from the first display or another display. Alternatively, the virtual object may emerge from some part of the real space, depending on the implementation.

At 708 the system tracks the location of the virtual object. The behavior of the virtual object in terms of size, appearance, movement, and sounds may also be tracked. This may be done within the system that generates the motions of the virtual object or in a separate tracking module. At 710 the presentation of the virtual object on the second display is updated as the virtual object moves and behaves in the real space.

At 712 the location of the virtual object is compared with that of other real objects such as the first display. A variety of different interaction may be presented on the second display depending upon the behavior of the virtual object and the nature of the real object. With a display, in this case the first display, when the virtual object's position coincides at least in part with the location of the first display, then at least a portion of the virtual object may be presented on the first display based on their relative locations.

These operations may be enhanced by, for example, presenting an interaction between the virtual object and items displayed on the first display, as in the example of the water ripples, above. The effects of the interaction may be displayed both on the first screen and on the second screen. The displayed objects on the second screen may also be converted into virtual objects and go beyond the real space of the first display. As an example, the water ripples may send water waves beyond the display out over the desk as AR waves shown in the second display.

Additional displays may be used so that the location of the virtual object with respect to the other real displays is tracked. When the virtual object's locations coincides with any of the displays then an interaction with that display may be presented. The presentation can be provided not only on the AR display but also on the displays in the real space. This may enhance the realism of the AR characters interactions.

There may also be other real objects that are not displays, such as the button candies, the book, and the display bezel in the salamander example. The interaction with these real objects may be limited to the AR display unless the interaction is large enough to also affect another display. If for example, the salamander were to throw or kick a button candy into the water on the third display, then the real object may be converted into another virtual object when it is thrown. When it reaches the display with the water, the virtual object becomes a displayed object and its trajectory and splash into the water may be presented on the third display in the real space as well as on the AR display.

In the same way additional virtual objects may be added to the scene. In the space ship example, there are several space ships. Similarly, there may be several salamanders or other virtual objects for the salamander to interact with such as other salamanders, food, prey, or predators. The location of all of these objects may be tracked simultaneously to proved interactions on the AR display and on the displays in the real space.

A variety of different user inputs and interaction may be added to the operations described above. These inputs may be used to represent interaction with one or more virtual objects and the corresponding interactions between the virtual objects and the user input may be presented on the AR display as well as the displays in the real space. The particular display in the real space to present the interaction will depend upon the location of the display in the real space compared to the interaction. The effects of the interaction can coincide with the location of a display in the real space even if the display is far away. For example if the salamander were to throw or kick something that virtual object might travel a long distance. Similarly an exploding space ship might scatter flames or debris over a large area. The particular user inputs may be selected based on the particular implementation. They may include an air gestures at a virtual object, touch screen gestures at a virtual object, and voice commands, among others.

The processes return for new launches of new or different AR characters or to generate new virtual objects in the reality space. The operations of FIG. 6 and FIG. 7 may be combined with other processes and may be repeated while other instances of such operations are continuing. The operations may be performed by multiple processing systems or by a single system with multiple displays.

Figure 8:
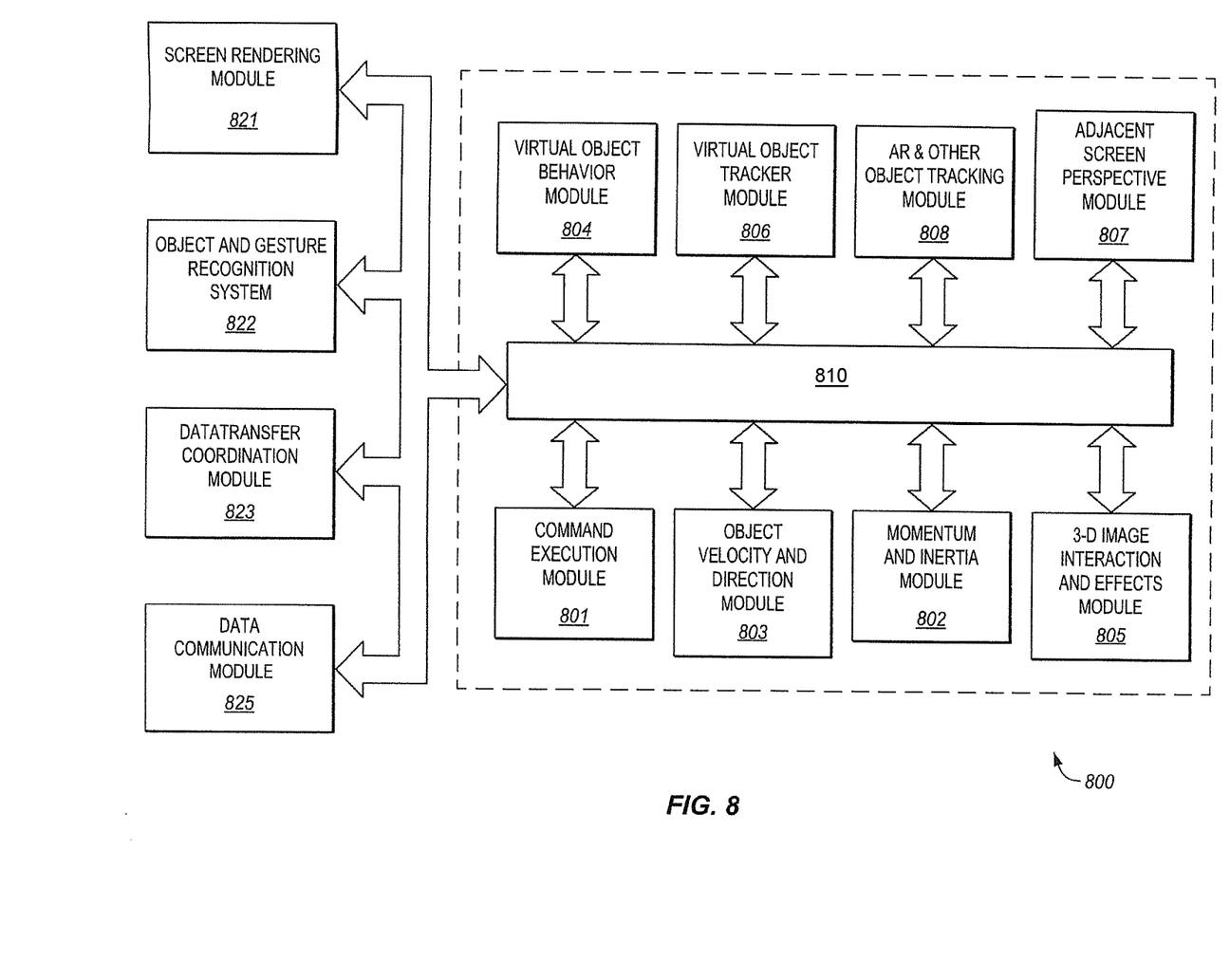
FIG. 8 is block diagram of a computer system suitable for implementing processes of the present disclosure according to an embodiment of the invention.

FIG. 8 is a block diagram of a computing environment capable of supporting the operations discussed above. The modules and systems may be implemented in a variety of different hardware architectures and form factors including that shown in FIG. 9.

The Command Execution Module 801 includes a central processing unit to cache and execute commands and to distribute tasks among the other modules and systems shown as well as to the remove systems through a communications interface 810. It may include a stack, a cache memory to store intermediate and final results, and mass memory to store applications and operating systems. The Command Execution Module may also serve as a central coordination and task allocation unit for the system.

The Screen Rendering Module 821 draws objects on the one or more multiple screens including the AR display for the user to see. It can be adapted to receive the data from the Virtual Object Behavior Module 804, described below, and to render virtual objects, real objects, displayed objects and any other objects and forces on the appropriate screen or screens. Thus, the data from the Virtual Object Behavior Module would determine the position and dynamics of the virtual object and associated movements, actions and sounds, for example, and the Screen Rendering Module would depict the virtual object and associated objects and environment on a screen, accordingly.

The Screen Rendering Module could further be adapted to receive data from the Adjacent Screen Perspective Module 807, described below, to either depict overlap between virtual objects and other screens. Thus, for example, if the virtual object is being moved from a first screen to a second screen, the Adjacent Screen Perspective Module 807 could send data to the Screen Rendering Module to suggest, for example how to render the virtual object on the second screen.

The Object and Gesture Recognition System 822 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a move a virtual object from one location or another. The Object and Gesture Recognition System may be coupled to a camera or camera array, a microphone or microphone array, a touch screen or touch surface, or a pointing device, or some combination of these items, to detect gestures and commands from the user.

A touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor data may be used to determine momentum and inertia factors to allow a variety of momentum behavior for a virtual object based on input from the user's hand, such as a swipe rate of a user's finger relative to the screen. Similar commands may be generated by the Object and Gesture Recognition System using one or more cameras without benefit of a touch surface.

The Data Transfer and Coordination Module 823 works with the various computing and display resources in the system to send information regarding virtual objects and effects to other devices so that these can be presented on the other displays. This module may also send audio information so that aural effects can be presented by speakers. The Data Transfer and Coordination Module may send parameters for other devices to use in determining displays or it may send completely rendered graphical effects ready for display or some other form of data depending on how computing tasks are distributed.

The Data Communication Module 825 contains the wired or wireless data interfaces that allows all of the devices in the system to communicate. There may be multiple interfaces with each device. In one example, the AR display communicates over WiFi to send detailed parameters regarding AR characters. It also communicates over Bluetooth to send user commands and to receive audio to play through the AR display device. Any suitable wired or wireless device communication protocols may be used.

The Virtual Object Behavior Module 804 is adapted to receive input from the Object Velocity and Direction Module 803, and to apply such input to a virtual object being shown—on—any one or more of the displays. Thus, for example, the Object and Gesture Recognition System would interpret a user gesture and by mapping the captured movements of a user's hand to recognized movements, the Virtual Object Tracker Module would associate the virtual object's position and movements to the movements as recognized by the Object and Gesture Recognition System, the Object Velocity and Direction Module would capture the dynamics of the virtual object's movements, and the Virtual Object Behavior Module would receive the input from the Object Velocity and Direction Module to generate data that would direct the movements of the virtual object to correspond to the input from the Object Velocity and Direction Module.

The Virtual Object Tracker Module 806 on the other hand may be adapted to track where a virtual object should be located in three dimensional space in a vicinity of a display. The Virtual Object Tracker Module 806 may for example track a virtual object as it moves across and between screens and track the locations of any real object or additional virtual objects that are near the virtual object. This may be used to provide an eventual awareness as to whether the virtual object's location coincides with one or more screens.

The AR and Other Object Tracking Module 808 coordinates character behavior when on various screens or between screens. For example, when the AR character has left one screen, that screen may no longer show that character until the end of the session or until its virtual location returns to that screen. In order to accomplish this, when AR characters are generated by the Virtual Object Behavior Module 804, the generating device uses data from the Virtual Object Tracker Module to understand the location of that character in the visual field relative to other screens. To do this, the image data may be analyzed by the Adjacent Screen Perspective Module to estimate distances among devices. The dimensions of the AR characters, centered on those locations, may be used to estimate whether the AR character is virtually touching a screen. Alternatively, data from the Virtual Object Tracker Module may be used with the Adjacent Screen Perspective Module to determine the specific location of AR character.

The Adjacent Screen Perspective Module 807, which may include or be coupled to the Momentum and Inertia Module 802 or a device proximity detection module (not shown), may be adapted to determine an angle and position of one display relative to another display. This may be used to determine the location and movements of the AR display using its camera or other sensors as well as to observe the positions of the other displays relative to each other. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 807 may, in this way, determine coordinates of an adjacent screen relative to its own screen coordinates. Thus, the Adjacent Screen Perspective Module may determine which devices are in proximity to each other, and further potential targets for moving one or more virtual objects across screens and between screens. The Adjacent Screen Perspective Module may further allow the position of the screens to be correlated to a model of three-dimensional space representing all of the existing objects and virtual objects.

The Object Velocity and Direction Module 803 may be adapted to estimate the dynamics of a virtual object being moved, such as its trajectory, velocity (whether linear or angular), momentum (whether linear or angular), etc. by receiving input from the Virtual Object Tracker Module 806. The Object Velocity and Direction Module may further be adapted to estimate dynamics of any physics forces, by for example estimating the acceleration, deflection, degree of stretching of a virtual binding, etc. and the dynamic behavior of a virtual object as it interacts with other objects. The Object Velocity and Direction Module may also use image motion, size and angle changes to estimate the velocity of virtual objects.

The Momentum and Inertia Module 802 can use image motion, image size, and angle changes of objects in the image plane or in a three-dimensional space to estimate the velocity and direction of objects in the space or on a display.

The 3-D Image Interaction and Effects Module 805 generates a three-dimensional space including virtual and real objects and tracks virtual object interaction with displayed images. It then allows the objects in the three-dimensional real space to be mapped to the location of one or more screens. The influence of objects in the z-axis (towards and away from the plane of the screen) can be calculated together with the relative influence of these objects upon each other. For example, an object thrown by a user gesture can be influenced by 3-D objects in the foreground before the virtual object arrives at the plane of the screen. These objects may change the direction or velocity of the projectile or destroy it entirely. The object can be rendered by the 3-D Image Interaction and Effects Module in the foreground on one or more of the displays.

Figure 9:
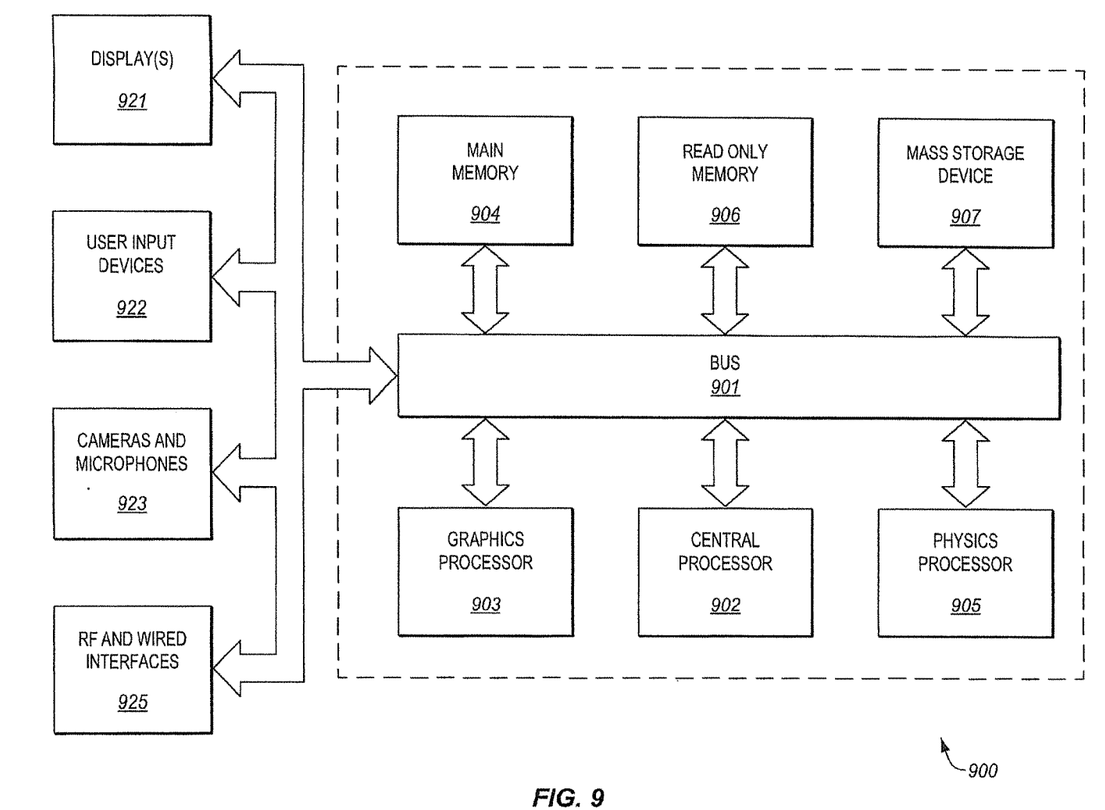
FIG. 9 is a block diagram of a an alternative view of the computer system of FIG. 8 suitable for implementing processes of the present disclosure according to an embodiment of the invention.

FIG. 9 is a block diagram of a computing system, such as a personal computer, tablet or slate computer, gaming console, smartphone or portable gaming device. The computer system 900 includes a bus or other communication means 901 for communicating information, and a processing means such as a microprocessor 902 coupled with the bus 901 for processing information. The computer system may be augmented with a graphics processor 903 specifically for rendering graphics through parallel pipelines and a physics processor 905 for calculating physics interactions as described above. These processors may be incorporated into the central processor 902 or provided as one or more separate processors.

The computer system 900 further includes a main memory 904, such as a random access memory (RAM) or other dynamic data storage device, coupled to the bus 901 for storing information and instructions to be executed by the processor 902. The main memory also may be used for storing temporary variables or other intermediate information during execution of instructions by the processor. The computer system may also include a nonvolatile memory 906, such as a read only memory (ROM) or other static data storage device coupled to the bus for storing static information and instructions for the processor.

A mass memory 907 such as a magnetic disk, optical disc, or solid state array and its corresponding drive may also be coupled to the bus of the computer system for storing information and instructions. The computer system can also be coupled via the bus to a display device or monitor 921, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 921.

Camera and microphone arrays 923 are coupled to the bus to observe gestures, record audio and video and to receive visual and audio commands as mentioned above.

Communications interfaces 925 are also coupled to the bus 901. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, or control surfaces or consoles, or servers via a conventional network infrastructure, including an Intranet or the Internet, for example.

A lesser or more equipped system than the example described above may be preferred for certain implementations. Therefore, the configuration of the exemplary systems 800 and 900 will vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
generating an augmented reality character as a virtual object on a first display, the character having parameters to control behavior of the character;
generating a reality space including the first and a third display and a space between the first and the third displays, the reality space including a trail of real objects between the first and the third displays;
receiving a launch trigger of the virtual object from the first display;
generating virtual behavior of the augmented reality character as motion of the virtual object along the trail of real objects and interaction of the virtual object with the trail of real objects in response to the launch trigger, the interaction occurring as the augmented reality character virtually touches the real objects and travels along the trail from the first display to the third display;
presenting the virtual object on the first display and a second display when the tracked location of the virtual object coincides with the location of the first display in the reality space;
presenting the virtual object on the second display in the space between the first and third display as the virtual object travels along the trail from the first display to the third display; and
presenting the virtual object on the third display and the second display when the tracked location of the virtual object coincides with the location of the third display in the reality space and as the virtual object moves onto the third display.

2. The method of claim 1, further comprising:
presenting displayed objects on the first display;
presenting an interaction between the displayed objects and the virtual object on the second display when the tracked location of the virtual object is proximate the first display; and presenting the effect of the interaction on the displayed objects on the first display.

3. The method of claim 2, further comprising converting the displayed objects into further virtual objects and presenting the further virtual objects on the second display but not the first display.

4. The method of claim 1, further comprising:
generating further virtual objects in the reality space; and
presenting an interaction between the virtual object and the further virtual objects on the second display when the tracked location is proximate the further virtual objects.

5. The method of claim 4, wherein the interaction includes an effect on the virtual object and an effect on the further virtual objects.

6. The method of claim 1, wherein the reality space includes additional real objects that are not along the trail, the method further comprising:
tracking a location of the virtual object in the reality space as the virtual object moves through the reality space between the first display and the third display as a result of the generated virtual behavior; and
presenting an interaction between the virtual object and the additional real objects on the second display when the tracked location is proximate the additional real objects in the reality space.

7. The method of claim 1, further comprising capturing data regarding the reality space at the second display and wherein presenting the virtual object on the second display comprises transferring data regarding the virtual object to the second display and the second display combining the data regarding the virtual object with captured data regarding the reality space.

8. The method of claim 1, wherein presenting the virtual object in the reality space on the second display includes presenting the virtual object on the first display when the tracked location coincides with the location of the first display.

9. The method of claim 1, further comprising presenting audio representations of the virtual object in the reality space, and modifying the audio representations using the tracked location.

10. The method of claim 1, further comprising receiving user input representing interaction with the virtual object and presenting the interaction between the virtual object and the user input on the second display.

11. The method of claim 10, wherein receiving user input comprises receiving at least one of an air gesture at the virtual object, a touch screen gesture at the virtual object, and a voice command.

12. The method of claim 1, wherein the reality space is a three-dimensional space, wherein the first display is a three-dimensional display, and wherein presenting the virtual object on the first display comprises presenting the virtual object as a three-dimensional presentation.

13. An apparatus comprising:
a processor;
an object velocity and direction module of the processor to generate a three-dimensional reality space representing a virtual object, a real first display, a real third display, and a trail of real objects between the first and the third displays, the virtual object representing an augmented reality character having a virtual behavior;
a screen rendering module of the processor to present, on a second display, a displayed area including the virtual object, the first display, the third display, and the trail of real objects between the first and the third displays and to present the virtual object on the second display as if on the first display, and on the third display, and in the space between the first and third displays as the virtual object travels along the trail from the first display to the third display;
a command execution module including the processor to receive and execute a launch trigger of the virtual object from the first display;
a virtual object behavior module of the processor to generate the virtual behavior of the augmented reality character as motion of the virtual object along the trail of real objects and interaction of the virtual object with the trail of real objects in response to the launch trigger;
a data transfer coordination module of the processor and coupled to a data communication module to send a presentation of the virtual object on the first display to the first display when the tracked location of the virtual object coincides with the location of the first display in the reality space and to send a presentation of the virtual object on the third display when the tracked location of the virtual object coincides with the location of the third display and as the virtual object moves onto the third display.

14. The apparatus of claim 13, wherein the object velocity and direction module generates displayed objects for the first display and the data transfer coordination module presents the displayed objects on the first display, the apparatus further comprising:
an image interaction and effects module of the processor to determine an interaction between the displayed objects and the virtual object when the tracked location of the virtual object is proximate the first display, and wherein the screen rendering module presents the determined interaction on the second display.

15. The apparatus of claim 13, wherein:
the object velocity and direction module generates further virtual objects in the reality space;
wherein the image interaction and effects module determines a virtual object's interaction between the virtual object and the further virtual objects when the virtual object is proximate the further virtual objects; and
wherein the screen rendering module presents the determined virtual object's interaction on the second display.

16. The apparatus of claim 13, wherein the reality space includes additional real objects, the apparatus further comprising an AR (Augmented Reality) and other objects tracking module of the processor to determine a real object interaction between the virtual object and the additional real objects when the virtual object location is proximate the additional real objects in the reality space, and wherein the screen rendering module presents the determined real object interaction on the second display.

17. The apparatus of claim 13, further comprising an adjacent screen perspective module of the processor coupled to a camera and coupled to the screen rendering module to determine an angle and position of the first display relative to the second display and provide the determined angle and position to the screen rendering module to correct the presentations on the second display.

18. A machine-readable non-transitory medium having instruction that when read by the machine cause the machine to perform operations comprising:
generating an augmented reality character as a virtual object on a first display, the character having parameters to control behavior of the character;

generating a reality space including the first and a third display and a space between the first and the third displays, the reality space including a trail of real objects between the first and the third displays;

receiving a launch trigger of the virtual object from the first display;

generating virtual behavior of the augmented reality character as motion of the virtual object along the trail of real objects and interaction of the virtual object with the trail of real objects in response to the launch trigger, the interaction occurring as the augmented reality character virtually touches the real objects and travels along the trail from the first display to the third display;

presenting the virtual object on the first display and a second display when the tracked location of the virtual object coincides with the location of the first display in the reality space;

presenting the virtual object on the second display in the space between the first and third display as the virtual object travels along the trail from the first display to the third display; and presenting the virtual object on the third display and the second display when the tracked location of the virtual object coincides with the location of the third display in the reality space and as the virtual object moves onto the third display.

19. The medium of claim 18, the operations further comprising:

presenting displayed objects on the first display;

presenting an interaction between the displayed objects and the virtual object on the second display when the tracked location of the virtual object is proximate the first display; and presenting the effect of the interaction on the displayed objects on the first display.

20. The medium of claim 18, the operations further comprising:

tracking the location of the virtual object with respect to the third display; and presenting the virtual object on the third display in the second display and presenting interactions of the virtual object with objects displayed in the third display.

* * * * *